United States Patent
Park et al.

(10) Patent No.: US 7,724,156 B2
(45) Date of Patent: May 25, 2010

(54) APPARATUS AND METHOD FOR CHARACTER ENTRY IN A PORTABLE TERMINAL

(75) Inventors: Young-Soo Park, Yongin-si (KR); Jae-Gwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 839 days.

(21) Appl. No.: 11/598,028

(22) Filed: Nov. 13, 2006

(65) Prior Publication Data

US 2007/0229314 A1 Oct. 4, 2007

(30) Foreign Application Priority Data

Mar. 16, 2006 (KR) ....................... 10-2006-0024144

(51) Int. Cl.
*H03M 11/00* (2006.01)
(52) U.S. Cl. .................. 341/22; 345/156; 345/168; 715/856; 715/864
(58) Field of Classification Search .................. 341/22; 345/156, 168; 715/856, 864
See application file for complete search history.

(56) References Cited

U.S. PATENT DOCUMENTS 6,487,424 B1* 11/2002 Kraft et al. .................. 455/566
2003/0179185 A1* 9/2003 Iwamura et al. ............. 345/168
2004/0021696 A1* 2/2004 Molgaard .................... 345/810
2004/0080487 A1* 4/2004 Griffin et al. ................ 345/156
2004/0223644 A1* 11/2004 Meurs ......................... 382/185
2006/0093422 A1* 5/2006 Van Britsom et al. ..... 400/615.2
2006/0256091 A1* 11/2006 Hino ........................... 345/173

FOREIGN PATENT DOCUMENTS

| JP | 2002-101178 | 4/2002 |
| JP | 2002-342011 | 11/2002 |
| KR | 10-2003-0013314 A | 2/2003 |

\* cited by examiner

*Primary Examiner*—Timothy Edwards, Jr.
(74) *Attorney, Agent, or Firm*—Roylance, Abrams, Berdo & Goodman, L.L.P.

(57) ABSTRACT

A character entry method and apparatus in a terminal in which characters are grouped into a plurality of character sets and a representative character of each of the character sets is imprinted on a respective key are provided. In the character entry method, when a key imprinted with a representative character is pressed, characters belonging to a character set represented by the representative character are displayed and any one of the displayed characters is marked with a selection indication. When a move key is pressed, the duration of the key press of the move key is measured and the selection indication is sequentially moved. When input of the move key is released, a character marked with the selection indication is entered.

22 Claims, 4 Drawing Sheets

APPARATUS AND METHOD FOR CHARACTER ENTRY IN A PORTABLE TERMINAL

CROSS-REFERENCE TO RELATED PATENT APPLICATION

This application claims the benefit under 35 U.S.C. §119(a) to a Korean patent application entitled "Apparatus and Method for Character Entry in a Portable Terminal", filed in the Korean Intellectual Property Office on Mar. 16, 2006, and assigned Serial No. 2006-24144, the entire disclosure of which is hereby incorporated by reference.

BACKGROUND OF THE INVENTION

1. Field of the Invention

The present invention relates to an apparatus and method for entering characters in a portable terminal. More particularly, the present invention relates to a character entry apparatus and method for reducing the number of key presses and the number of wrong entries in a portable terminal.

2. Description of the Related Art

Typically, a small-size portable terminal has a limited number of keys, for example, 10 to 12 keys to enter characters with. For languages having 10 to 12 characters in their alphabet, one character is allocated to each key. However, for languages that have a greater number of characters in their alphabet, one key-to-one character assignment is not possible.

FIG. 1 is a diagram illustrating a keypad in a portable terminal, configured to enter Japanese characters according to a Japanese standard.

Referring to FIG. 1, the Japanese characters of the Japanese alphabet (Hiragana) are arranged in order by groups of five characters for assignment to each key. For example, a group of "あいうえお" is allocated to a digit "1" key, and a group of "かきくけこ" to a digit "2" key. In this manner, a plurality of characters may be allocated to the other digit keys and each digit key is imprinted with the first character of a corresponding group.

On a keypad with the above Japanese alphabet layout, a user enters text in a multi-tap fashion. For example, to enter a word "かえろ" he presses the digit "2" key twice for entering "か", presses the digit "1" key four times for entering "え" and presses the digit "9" key five times for entering "ろ". The word "かえろ" takes a total of 10 taps.

For most languages, character entry relies on the multi-tap scheme. Because of mapping between a plurality of characters and one key, the multi-tap scheme is not user-friendly and is vulnerable to an incorrect entry. To solve this problem, a single-tap character entry scheme was proposed. For details about the single-tap scheme, see T9 (http//www.T9.com), eZi (http//gcorp.com), itap (http//www.mot.com/lexicus/html/itap.html), and for the Japanese language, POS (http//www-.muchy.com), the entire disclosures of all of which are hereby incorporated by reference. In the single-tap scheme, one tap or key press is sufficient for entry of one character. This entry scheme is based on an algorithm which automatically displays a word matching to a combination of input characters after searching a dictionary of a given language.

By way of example for the English language, to enter "boy" by the single-tap scheme, the user presses the digit "1" key having the letters "ABC" imprinted thereon for entering "b", the digit "6" key for entering "o", and the digit "9" key for entering "y". Upon entry of the first character "b", a given dictionary is searched with "b" used as a search key, and upon entry of the second character "o", "bo" is used as a search key. Finally, upon entry of the last character "y", the dictionary is searched using "boy" as a search key. Since "boy" is registered in the dictionary, the user selects "boy".

3×3×3 character combinations can be created using three keys ABC, MNO and WXY. With the first key press, "ABC" is entered at once, and with the second key press "MNO" is entered at once, thereby displaying the possible combinations of letters in ABC times MNO, such as AM, AN, AO, BM, BN, BO, CM, CN, CO. Here, the desired character combination is "bo". The system continuously searches the dictionary for the next character entry despite the possibility of there being correct words among the two-character combinations, and finally identifies the desired word. During the process, the character combinations associated with the key presses, which can be used as the beginning of the desired word, for example, "bo", can be selected and displayed continuously. Then, the dictionary is searched in order to find all of the words, which include "bo" in the beginning of the words, and displays the resulting words. The user can identify and select the desired word among the words that the system speculates and displays.

As described above, the single-tap scheme has recently emerged as a character entry technique for a small-size keypad with a limited number of keys, thereby substituting for the multi-tap scheme. The single-tap scheme pursues the efficiency of character entry through a reduction of the number of key presses- and increases the likelihood of accurate character entry.

As previously stated, a plurality of characters are inevitably allocated to a single key in a keypad with a limited number of keys and thus one character is accessed by the multi-tap scheme, despite the shortcomings of a large number of key presses and frequent wrong entry.

On the other hand, while the single-tap scheme is effective in reducing the number of key presses, it requires a dictionary for a given language and updating of the dictionary with newly coined words, new abbreviations, or the like. In practice, it is not possible to include every needed word in a rapidly developing information and communication environment, such as person names, Internet addresses, home addresses, or the like. What is worse, for a word not registered in the dictionary, the single-tap scheme must be used in conjunction with the multi-tap scheme. In this context, the one-key-for-one-letter method has its own limitations and increases system load due to a large number of character combinations resulting from a plurality of character entries and the accompanying directional searches.

Accordingly, there is a need for an improved apparatus and method for character entry to substantially solve problems encountered with the multi-tap and single-tap schemes.

SUMMARY OF THE INVENTION

Exemplary embodiments of the present invention address at least the above problems and/or disadvantages and provide at least the advantages described below. Accordingly, an aspect of the present invention is to provide an apparatus and method for character entry to substantially solve problems encountered with the multi-tap and single-tap schemes.

Another aspect of the present invention is to provide an apparatus and method for efficiently entering characters in a portable terminal.

A further aspect of the present invention is to provide an apparatus and method for character entry to reduce the number of key presses and likelihood of an erroneous entry.

The above aspects are achieved by a providing character entry method and apparatus in a terminal in which characters are grouped into a plurality of character sets and a representative character of each of the character sets is imprinted on a respective key.

According to one aspect of the present invention, in a character entry method in a terminal in which characters are grouped into a plurality of character sets and a representative character of each of the character sets is imprinted on a respective key, when a key imprinted with a representative character is pressed, characters belonging to a character set represented by the representative character are displayed and any one of the displayed characters is marked with a selection indication. When a move key is pressed, the duration of the key press of the move key is measured and the selection indication is sequentially moved. When input of the move key is released, a character marked with the selection indication is entered.

According to another aspect of the present invention, in a character entry apparatus in a portable terminal, a keypad has a plurality of keys wherein characters are grouped into a plurality of character sets and a representative character of each of the character sets is imprinted on a respective key of the plurality of keys. When a key imprinted with a representative character is pressed, a display displays characters belonging to a character set represented by the representative character and any one of the displayed characters marked with a selection indication. When a move key is pressed, a controller measures the duration of the key press of the move key, moves the selection indication sequentially, and enters a character marked with the selection indication when input of the move key is released.

Other aspects, advantages, and salient features of exemplary implementation of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A description will be made of an exemplary character entry method for a terminal equipped with a keypad having a limited number of keys.

In accordance with an exemplary embodiment of the present invention, the characters of an alphabet of a given language are grouped according to criteria. The criteria can be alphabetical order, phonetic value, character shape, or grammatical characteristics. The criteria are set such that the characters can be grouped with optimal visibility and recognizability to the user. The number of the resulting character groups is, for example, 5 to 12, considering that the keypad typically has 12 keys, 5 to 12 character sets are easily allocated to the keys.

After the grouping, a representative character is selected from the characters of each group. The representative characters are determined according to the feature of the language, and it is preferred that each character set has no more than three representative characters. Since the representative characters are imprinted on a small key, the visibility and recognizability of the character layout decreases with the number of representative characters on each key. Accordingly, the representative characters are selected, taking into account visibility and recognizability. Subsequently, the representative characters are allocated and imprinted on about 12 keys on the keypad.

While the present invention is applicable to any language as far as it has a plurality of characters in its alphabet, such as Japanese, Russian, Vietnamese, Hebrew, Arabic, Thai, Chinese, and Korean. However, exemplary embodiments of the present invention are described in the context of the Japanese language.

Figure 1:
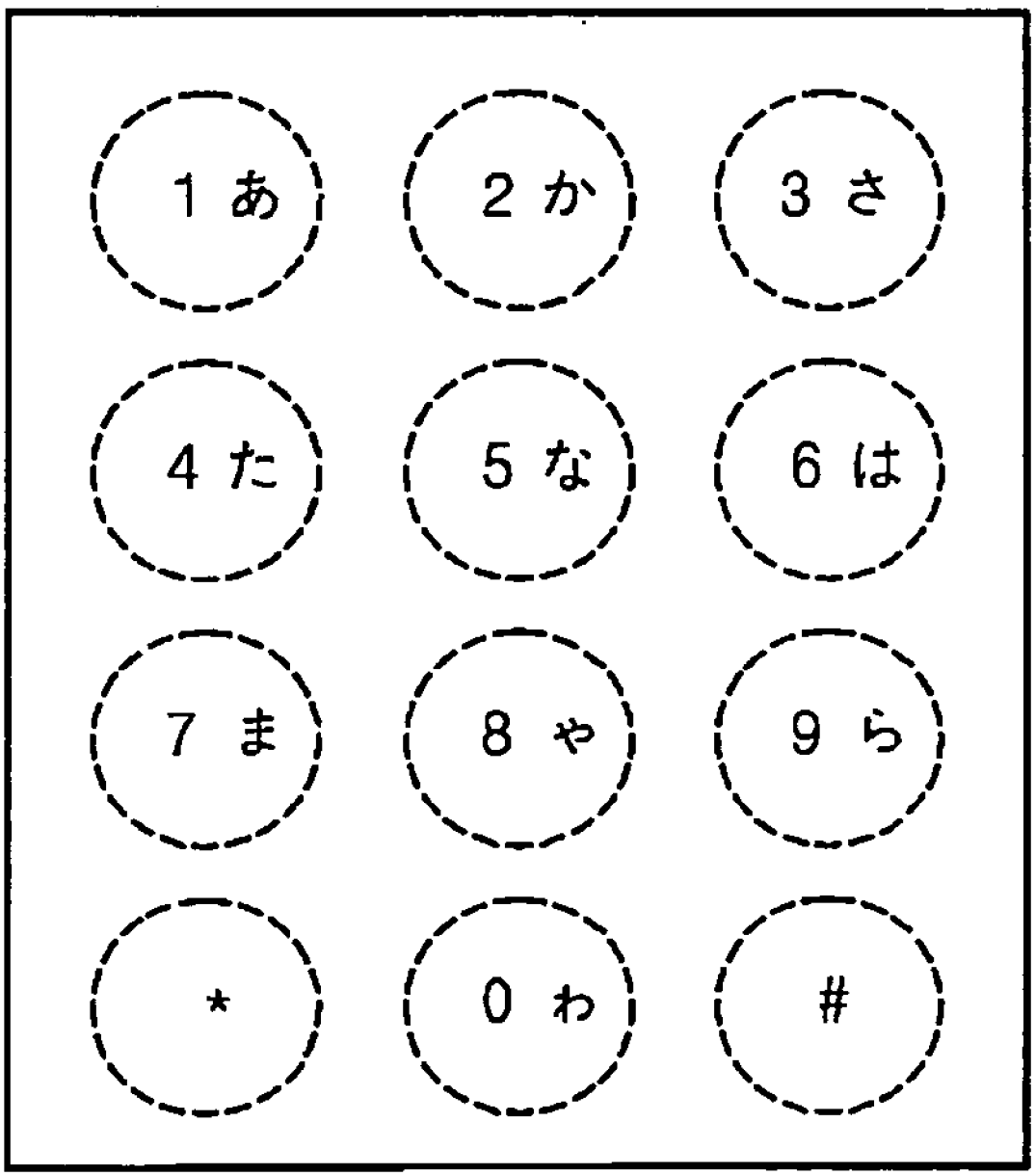
FIG. 1 is a diagram illustrating a keypad in a portable terminal, configured to enter the Japanese characters according to a Japanese standard.

Grouping of the Japanese characters (Hiragana) and selection of representative characters are based on the keypad layout illustrated in FIG. 1, as a virtual Japanese standard. As described earlier, the Japanese alphabets are grouped row by row, for example, the "あ"row, "い"row, and "さ"row. The first character in each row is a representative of the characters in the character set of the row and is imprinted on a corresponding key.

Figure 2:
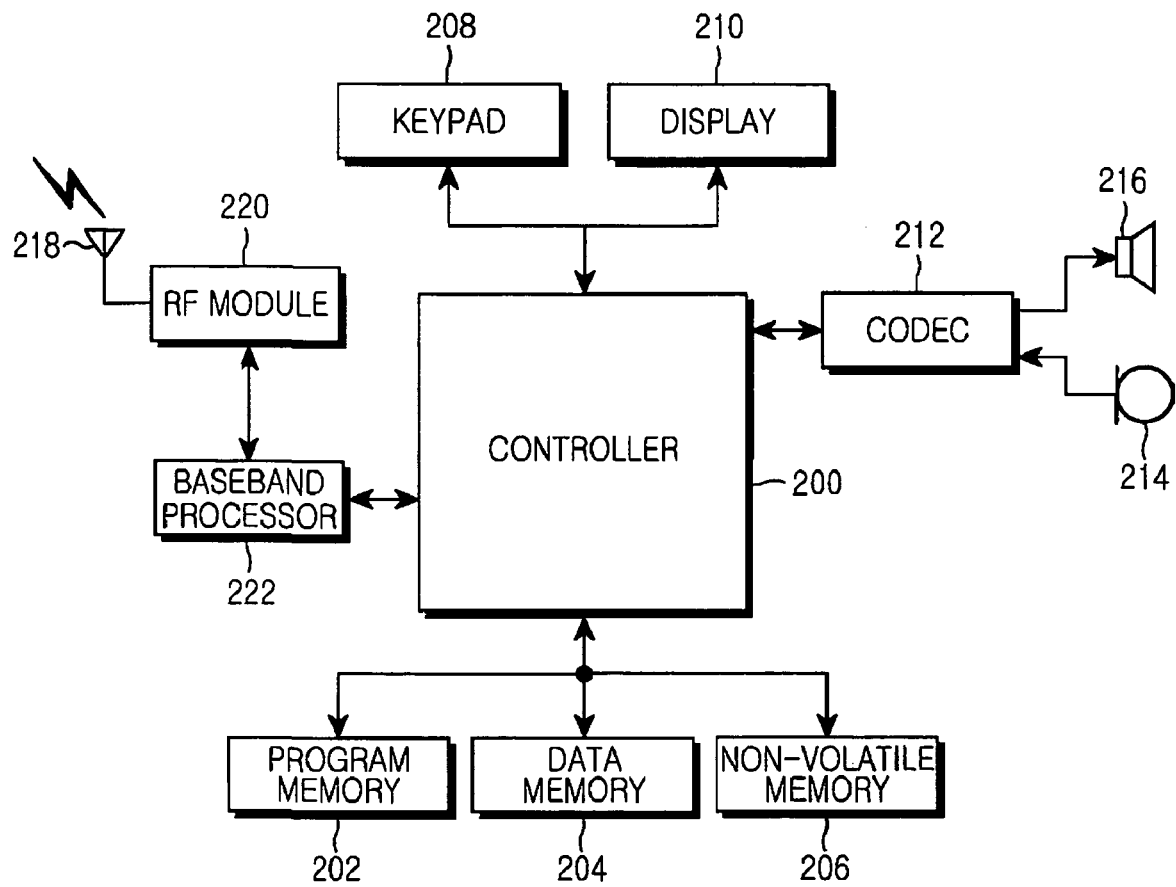
FIG. 2 is a block diagram illustrating an apparatus for entering characters in a portable terminal according to an exemplary embodiment of the present invention.

FIG. 2 is a block diagram illustrating an apparatus for entering characters in a portable terminal according to an exemplary embodiment of the present invention. The term "portable terminal" includes, but is not limited to, a cellular phone, a Personal Communication System (PCS), a Personal Data Assistant (PDA), an International Mobile Telecommunicaiton-2000 (IMT-2000) terminal, and a $4^{th}$ generation broadband system terminal. The following description is made of a configuration common to the above terminals.

Referring to FIG. 2, a controller 200 provides overall control to the portable terminal. For example, controller 200 processes and controls the portable terminal for voice calls and data communications. In addition to the conventional functionality, the controller 200 performs a character entry algorithm according to an exemplary embodiment of the present invention.

A memory includes a program memory 202, a data memory 204, and a non-volatile memory 206. The memory stores programs for controlling the overall operation of the terminal, temporary data generated during the operation of the terminal, system parameters, and other data to be kept, such as phone numbers, Short Message Service (SMS) messages, or the like.

A keypad 208 is provided with a 4×3 digit key matrix and a plurality of function keys including Talk, OK, and directional keys. The keypad 208 provides key input data corresponding to a key pressed by the user to the controller 200. According to an exemplary embodiment of the present invention, the digit keys are imprinted with the representative characters of character sets grouped according to a predetermined criterion. As illustrated in FIG. 1, the digit keys 1 to 0 are sequentially imprinted with "あ", "か", "さ", "た", "な", "は", "ま", "や", "う" and "わ" thereon. An input means and a plurality of input elements used in other type of input method corresponding to the keypad and keys can be configured.

A display 210 displays status information or indicators generated during the operation of the terminal, user-input characters, moving pictures, and still images. The display 210 may be implemented as a touch screen that senses the user's touch.

An audio Coder-Decoder (CODEC) 212 connected to the controller 200, and a speaker 216 and a microphone 214 connected to the CODEC 212 collectively form a voice input/output portion for voice call.

A Radio Frequency (RF) module 220 processes an RF signal received/transmitted from/to an antenna 218. A baseband processor 222 processes baseband signals transmitted/received between the RF module 220 and the controller 200.

Figure 3:
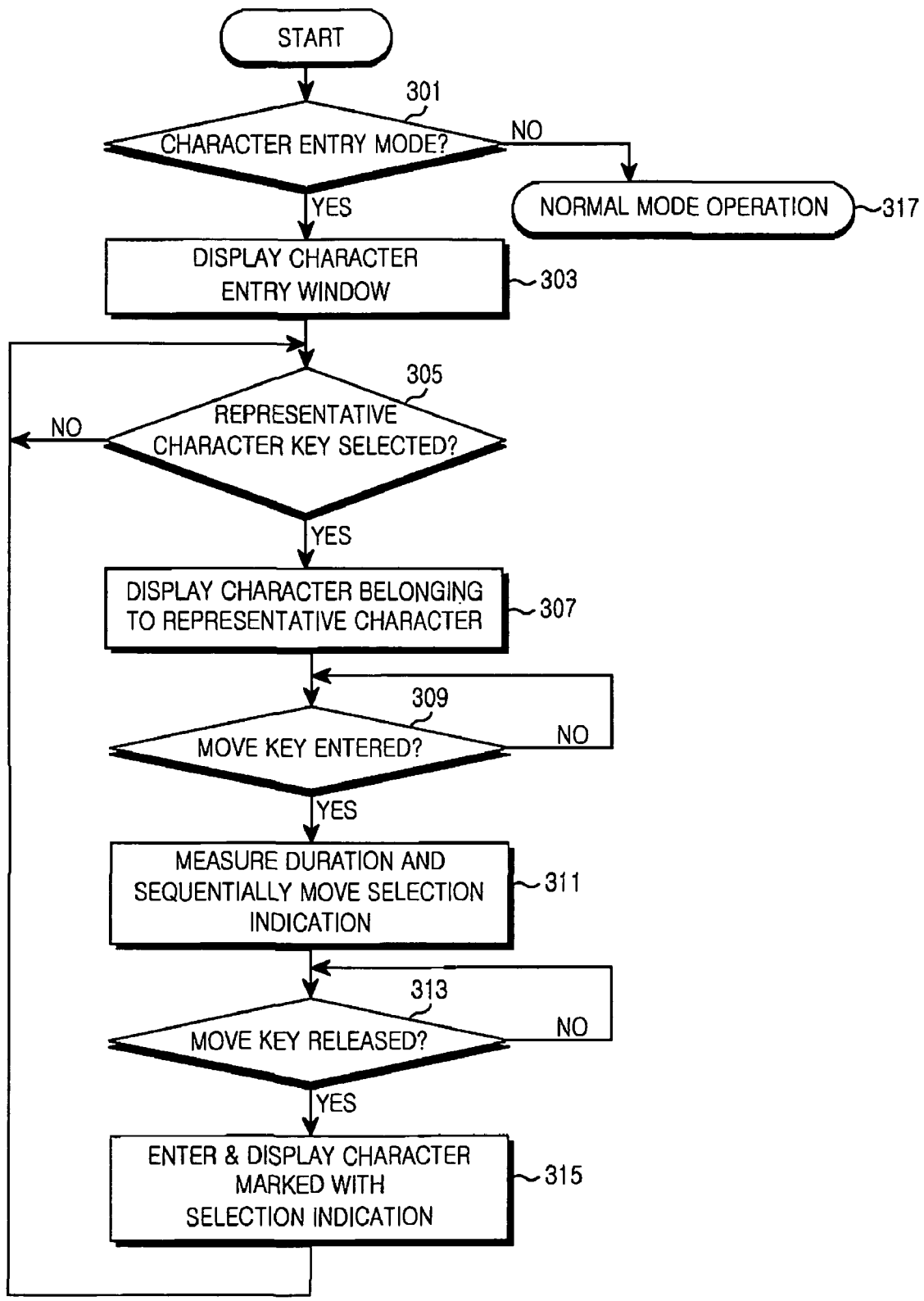
FIG. 3 is a flowchart illustrating an operation for entering Japanese characters in the portable terminal according to an exemplary embodiment of the present invention.

FIG. 3 is a flowchart illustrating an operation for entering Japanese characters in the portable terminal according to an exemplary embodiment of the present invention.

Referring to FIG. 3, the controller 200 monitors an user-selection of character entry mode in step 301. The character entry mode can be any mode requiring character entry such as a message writing mode, a memo mode, and a schedule mode.

If the character entry mode is not selected, the controller 200 performs a normal mode operation, such as an idle mode operation, in step 317. Upon selection of the character entry mode, the controller 200 displays a character entry window on the display 210 in step 303.

In step 305, the controller 200 monitors the input of a key with a representative character imprinted thereon, hereinafter referred to as a representative character key. Upon input of the representative character key, the controller 200 displays the characters of a character set that the representative character stands for in step 307. In an exemplary implementation, the characters of a character set that the representative character stands are displayed at the lower part of the screen.

Figure 4A:
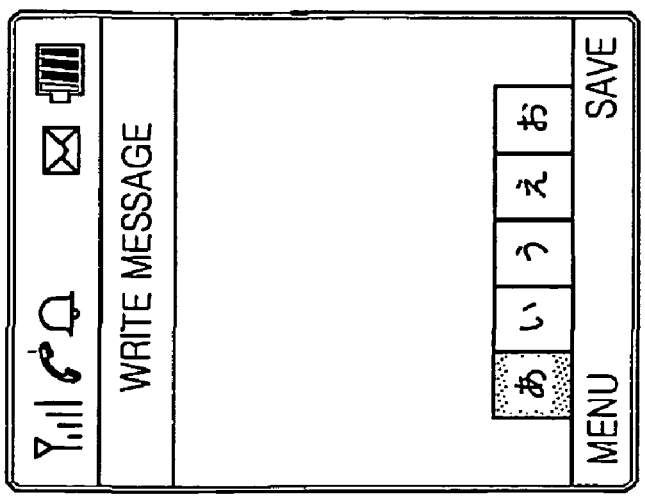
FIGS. 4A to 4C are diagrams illustrating an example of Japanese character entry according to an exemplary embodiment of the present invention.
Figure 4B:
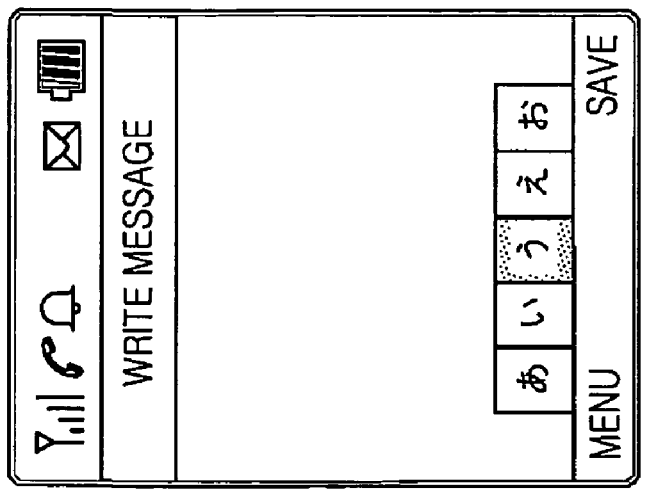
Figure 4C:
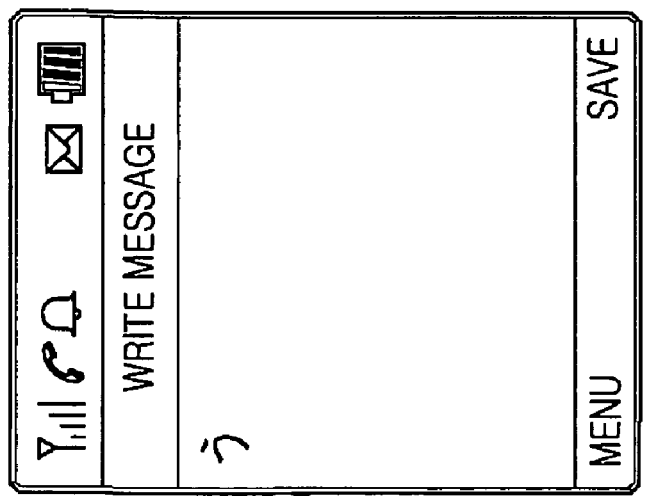

FIGS. 4A to 4C are diagrams illustrating an example of the characters of a character set displayed on the screen. Referring to FIG. 4A, a first character is marked with a selection indication, but it is not limited. The selection indication may be positioned at any other position. The selection indication may be implemented by shading, underlining, flashing, balloon marking, magnification, and the like.

After displaying the character elements represented by the representative character, the controller 200 monitors input of the move key in step 309. The move key is a key designated as used to move the selection indication among the keys of the keypad 208. For example, the move key may be a directional key, or a right move key may be one of the digit 3 key and # key, and a left move key may be one of the digit 1 key and * key.

Upon input of the move key, the controller 200 measures the key press duration of the move key and moves the selection indication sequentially in step 311. For example, if criterion duration is 2 seconds, the controller 200 moves the selection indication to the next character every 2 seconds. Meanwhile, a user releases the press of the move key when the selection indication has been moved. In the screen display illustrated in FIG. 4A, for entering a character "う" the move key is pressed until the selection indication is positioned at the character "う" as shown in FIG. 4B.

Thus, the controller 200 monitors input of a move key is released. When input of the move key is released at step 313, the controller 200 enters a character marked with the selection indication at step 315. For example, In the screen display illustrated in FIG. 4B, when the move key is released, the controller 200 displays the character "う" on a main screen as shown in FIG. 4C. Then the controller 200 returns to step 305 to process the next character entry.

Meanwhile, for input of a character, such as a first character, marked with the selection indication, the move key is pressed for a shorter period of time. Because the key press duration of move key is shorter than criterion duration, such as 2 seconds, the selection indication is not moved. Thus, the controller 200 monitors a position of the selection indication at the time on which released input of the move key, and enters a corresponding character, such as the first character. As another exemplary embodiment, for input of the first character marked with the selection indication, an OK key may be pressed. Herein, the OK key can be a key designated among the keys of the keypad 208.

As described above, certain exemplary embodiments of the present invention may reduce the number of key presses and wrong entries, compared to the conventional multi-tap scheme. Since the exemplary embodiments of the present invention reduces the need for a dictionary database and a dictionary search algorithm required for the conventional single-tape scheme, exemplary implementations can be simpler and system load can be decreased. Furthermore, character grouping and designation of representative characters can be are simpler and more flexible, which makes exemplary embodiments of the present invention applicable to a variety of languages.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A character entry method in a terminal, the method comprising:
   entering a key comprising a representative character;
   displaying characters belonging to a character set represented by the representative character;
   marking one of the displayed characters with a selection indication;
   measuring a duration of the press of a move key while the move key is pressed;
   moving the selection indication to a direction indicated by the move key when the duration arrives at a predefined period of time; and
   entering a character marked with the selection indication when input of the move key is released.

2. The character entry method of claim 1, wherein the selection indication comprises at least one of shading, underlining, flashing, and magnification.

3. The character entry method of claim 1, further comprising displaying the entered character on a main screen.

4. The character entry method of claim 1, wherein the move key comprises a right directional key and a left directional key.

5. The character entry method of claim 1, wherein the characters belonging to a character set represented by the representative character are displayed at a lower part of the screen.

6. The character entry method of claim 1, further comprising entering a character marked with the selection indication among the displayed characters when a confirmation key is pressed.

7. The character entry method of claim 6, wherein the confirmation key comprises an OK key.

8. The character entry method of claim 1, wherein the key and the move key are comprised of a key pad of the terminal.

9. The character entry method of claim 8, wherein the key pad comprises a plurality of keys, and
wherein a respective key of the plurality of keys comprises a representative character representing each of character sets.

10. The character entry method of claim 9, wherein a number of the character sets is less than or equal to a number of the keys comprising the representative characters.

11. A character entry apparatus in a portable terminal, comprising:
a keypad having a plurality of keys wherein characters are grouped into a plurality of character sets and a respective key of the plurality of keys comprises a representative character of each of the character sets;
a display for, when a key with a representative character is pressed, displaying characters belonging to a character set represented by the representative character and marking one of the displayed characters with a selection indication; and
a controller for measuring a duration of the press of a directional key while the directional key is pressed, moving the selection indication to a direction indicated by the directional key when the duration arrives at a predefined period of time and entering a character marked with the selection indication when input of the directional key is released.

12. The character entry apparatus of claim 11, wherein the selection indication comprises at least one of shading, underlining, flashing, and magnification.

13. The character entry apparatus of claim 11, wherein the display displays the entered character on a main screen.

14. The character entry apparatus of claim 11, wherein the directional key comprises a right directional key and a left directional key.

15. The character entry apparatus of claim 11, wherein the characters belonging to a character set represented by the representative character are displayed at a lower part of the screen.

16. The character entry apparatus of claim 11, wherein a number of the character sets is less than or equal to a number of the keys comprising the representative characters.

17. The character entry apparatus of claim 11, wherein the controller enters a character marked with the selection indication among the displayed characters when a confirmation key is pressed.

18. The character entry method of claim 17, wherein the confirmation key comprises an OK key.

19. A portable terminal comprising:
an input means having a plurality of input elements wherein characters are grouped into a plurality of character sets and a respective input element of the plurality of the input elements comprises a representative character of each of the character sets;
a display for, when an input element with a representative character is activated, displaying characters belonging to a character set represented by the representative character and marking one of the displayed characters with a selection indication; and
a controller for measuring a duration of the activation of the directional key while the directional key is pressed, moving the selection indication to a direction indicated by the directional key when the duration arrives at a predefined period of time, and entering a character marked with the selection indication when input of the directional input element is released.

20. The portable terminal of claim 19, wherein the selection indication comprises at least one of shading, underlining, flashing, and magnification.

21. A character entry method in a terminal, the method comprising:
entering an input element comprising a representative character;
displaying characters belonging to a character set represented by the representative character;
marking one of the displayed characters with a selection indication;
measuring a duration of the activation of the move input element while the move input element is activated;
moving the selection indication to a direction indicated by the move input element when the duration arrives at a predefined period of time; and
entering, when input of the move input element is released, a character marked with the selection indication.

22. The character entry method of claim 21, wherein the selection indication comprises at least one of shading, underlining, flashing, and magnification.

* * * * *